Sept. 19, 1961  A. PAUL  3,000,543
PLUG-IN PUMP ASSEMBLY
Filed Sept. 22, 1958  2 Sheets-Sheet 1
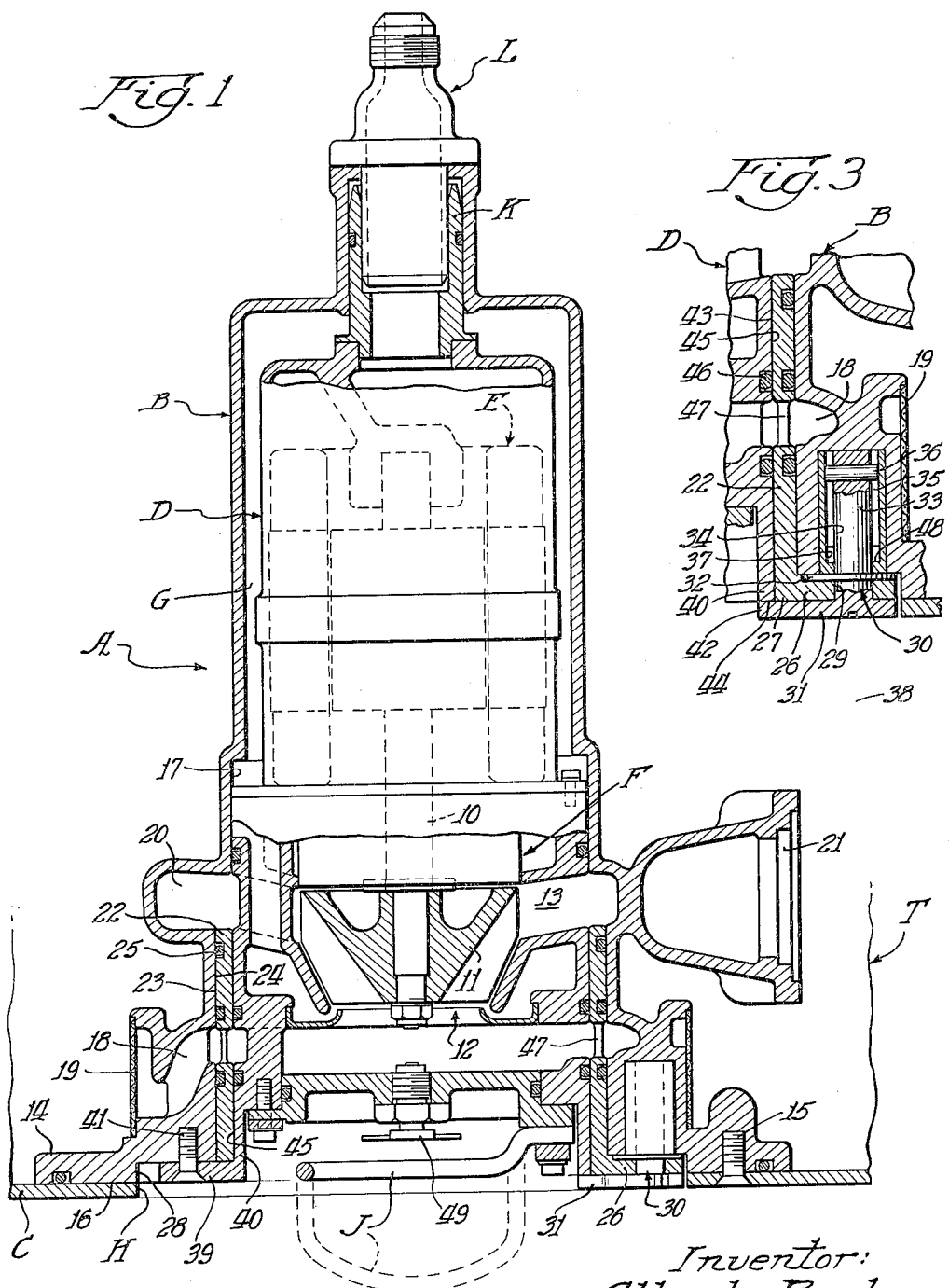
Inventor:
Albert Paul
By: Frank C. Parker Atty.

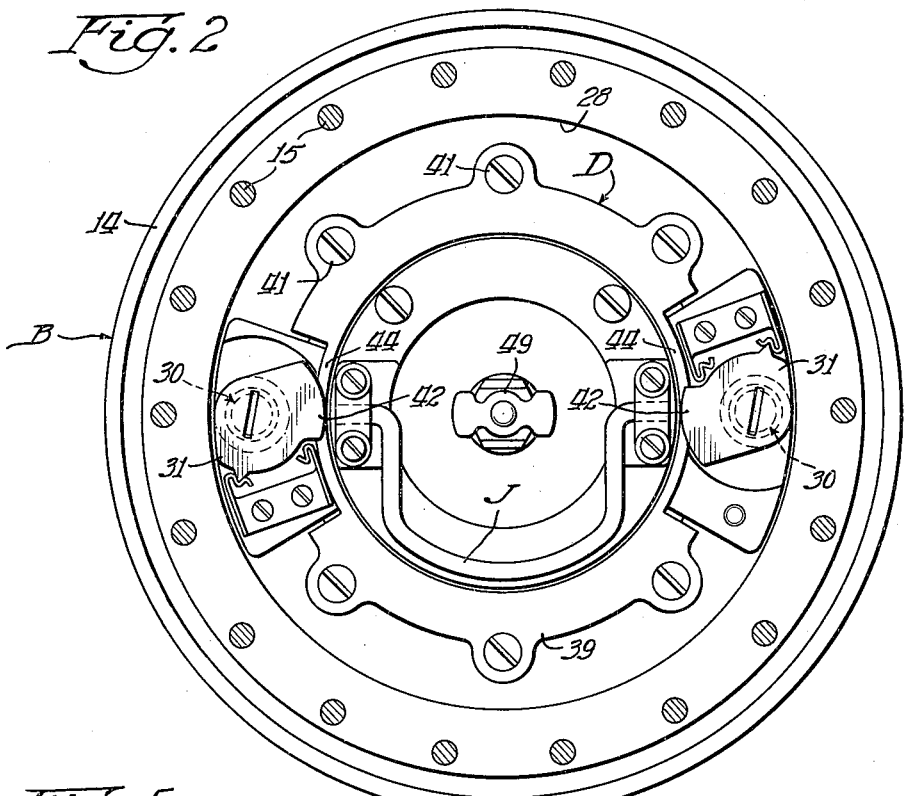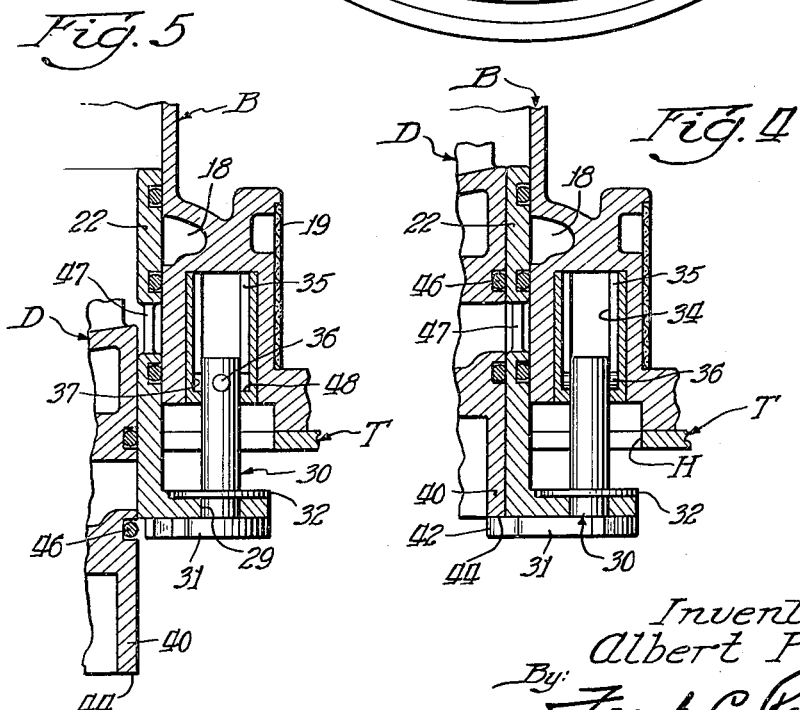

United States Patent Office 3,000,543
Patented Sept. 19, 1961

3,000,543
PLUG-IN PUMP ASSEMBLY
Albert Paul, Cleveland, Ohio, assignor to Borg-Warner Corporation, Chicago, Ill., a corporation of Illinois
Filed Sept. 22, 1958, Ser. No. 762,348
5 Claims. (Cl. 222—333)

This invention relates to a plug-in pump assembly, and, in particular, to a plug-in pump assembly wherein a cartridge type pump and motor unit is adapted to be received within a housing mounted within a fuel tank and secured thereto, the housing having means whereby fluid communication is permitted between the interior of the fuel tank and the pump inlet means when the pump and motor unit is inserted therein and whereby fluid communication is prevented between the interior of the fuel tank and the exterior thereof when the pump and motor unit is removed therefrom.

In modern aircraft booster pump applications, it has been found desirable to mount the fuel booster pump assembly within a fuel tank, and, preferably, to mount the fuel booster pump assembly within the fuel storage tank adjacent a bottom wall thereof. However, when the fuel booster pump assembly has been so mounted, some means must be provided in order that the pump and motor unit thereof can be readily removed from the fuel storage tank for replacement thereof and for other maintenance problems. Heretofore, access means have been provided in the top wall of the fuel storage tank to provide means for inserting and removing the pump and motor unit from the storage tank. Such access means requires, however, that the fuel in the fuel storage tank must be drained prior to the insertion or the removal of the pump and motor unit in order to permit the mechanic to locate the detachable mounting means to respectively secure or release the pump and motor unit from the interior of the fuel storage tank. Other designs provide for inserting the pump and motor unit through an access means formed in the bottom wall of the fuel storage tank. These latter designs require that some structure must be provided to either prevent the escape of fuel from the storage tank through the access means during the removal and insertion of the pump and motor unit or to permit draining of the fuel from the storage tank prior to such removal or insertion.

It is, therefore, an object of this invention to provide an improved pump and motor assembly whereby a pump and motor unit is adapted to be inserted through an access means formed in a wall of the fuel tank and be removed therefrom without fluid leakage between the interior of the fuel tank and the exterior thereof.

Another object of this invention is to provide an improved pump and motor assembly whereby a pump and motor unit having a pump inlet means is adapted to be inserted through an access means formed in a wall of a fuel storage tank, the pump and motor unit being received within a housing mounted within the fuel storage tank and having means for permitting fluid communication between the interior of the fuel tank and the pump inlet means when the pump and motor unit is inserted therein and for preventing fluid communication between the interior of the fuel tank and the exterior thereof when the pump and motor unit is removed therefrom.

Other and more particular objects, advantages and uses of this invention will become apparent from a reading of the following specification taken in connection with the accompanying drawings, forming a part thereof and wherein:

FIG. 1 illustrates, in a cross-sectional view, a pump and motor assembly formed in accordance with the teachings of this invention and comprising a pump and motor unit disposed within a housing secured to a bottom wall of a fuel storage tank, FIG. 1 being taken on line 1—1 of FIG. 2.

FIG. 2 illustrates an end view of the pump and motor assembly illustrated in FIG. 1.

FIG. 3 illustrates, in a fragmentary cross-sectional view, particular details of the assembly of FIG. 1.

FIG. 4 illustrates a view similar to FIG. 3 except that the pump and motor unit is partially withdrawn from the housing.

FIG. 5 illustrates a view similar to FIG. 4 except that the pump and motor unit is further withdrawn from the housing.

Reference is now made to the accompanying drawings wherein like reference numerals and letters are used throughout the various figures thereof, where appropriate, to indicate like parts, and particular reference is made to FIG. 1 wherein a pump and motor assembly, indicated generally by the reference letter A, comprises a housing B secured to a bottom wall C of a fuel storage tank T, the housing B receiving a pump and motor unit D therein. It is to be understood, of course, that the housing B could be secured to any wall of the fuel storage tank T or other device if desired.

The pump and motor unit D comprises a suitable electric motor, indicated generally by the reference letter E, having a shaft 10 carrying a pump impeller 11 of a pump F. The pump and motor unit D is provided with a pump inlet means 12 and a pump outlet means or discharge means 13. The pump and motor unit D operates in a manner common in the art whereby the electrical motor E rotates the shaft 10 and thus the impeller 11 which is adapted to receive fluid from the pump inlet means 12 and deliver the same under pressure through the outlet means 13.

The housing D may be a one piece structure and is provided with an outwardly flared end portion 14 which is adapted to be detachably secured to the bottom wall C of the fuel tank T by a plurality of bolts or other suitable fastening means 15. The housing D has one end 16 thereof interrupted by bore means 17 to provide a pump and motor unit receiving chamber G therein. The housing D is so mounted relative to an aperture or access means H formed in the wall C that the cavity or chamber G therein cooperates with the aperture H to permit the pump and motor unit D to be inserted through the aperture H and be received into the chamber G. Inlet passage means 18 are formed in the housing D and are adapted to cooperate with the pump inlet means 12 of the pump and motor unit D when the unit D is inserted within the chamber G. A suitable screen 19 is disposed within inlet passage means 18 to filter the fuel passing into the pump inlet means 12. The housing D is formed with a scroll-like discharge means 20 which is adapted to cooperate with the pump outlet means 13 of the pump and motor unit D, when the pump and motor unit D is fully inserted within the chamber G. The discharge scroll means 20 is provided with suitable coupling means 21 at the outer end thereof whereby the discharge means 20 may be attached to a pump fuel line (not shown) leading to a utilization device (not shown).

A movable hollow sleeve or closure member 22 is disposed within the chamber G and has the outer periphery 23 thereof disposed in sealing contact with the inner periphery 24 of the chamber G by means of suitable O-ring seals 25 carried by the sleeve 22. The hollow cylindrical sleeve 22 is adapted to be carried by the housing D and be axially moveable relative thereto. The sleeve 22 is provided with a pair of opposed, outwardly flaring ear or lug portions 26 at one end 27 thereof, the ear portions 26 being adapted to be received within a counterbore 28 formed in the end 14 of the housing D. Although only one pin member 30 is illustrated in FIGS. 1, 3, 4 and 5, it is to be understood that the other pin member is constructed in the same manner. Each ear portion 26 is suitably apertured at 29 to receive a pin member 30 therethrough, the pin member 30 having an eccentrically disposed plate or abutment means 31 disposed on one side of ear portion 26 and a retainer-like washer 32 disposed on the other side of the ear portion 26. Each pin member 30 has an elongated shaft portion 33 received within a bore 34 formed in the housing D. Each bore 34 is provided with a pair of grooves 35 which are disposed diametrically opposite from each other and are adapted to cooperate with a pin 36 carried by the end of the shaft portion 33 of the respective pin member 30.

As shown in FIGS. 1, 3, 4 and 5, the pin members 30 are adapted to be axially moved within the bores 34 formed in the housing B when the pins 36 carried thereby are received in the grooves 35 of the respective bore 34. Each bore 34 is provided with an annular groove 37 which is adapted to cooperate with the pin 36 when the pin 36 is disposed in alignment therewith permitting rotation of the pin member 30 about its axis 38. It is to be understood that axial movement of the pin members 30 causes axial movement of the sleeve or closure member 22 relative to the housing B as the sleeve 22 is carried by the pin members 30.

The pump and motor unit D is provided with an outwardly projecting flange or lip 39 at one end 40 thereof, the flange 39 being adapted to be fastened to the housing B by a plurality of bolts 41. The end 40 of the pump and motor unit D is also provided with a collapsible handle J which is adapted to be manually grasped for inserting and removing the pump and motor unit D from the housing B.

As shown in FIG. 2, the eccentrically disposed plates 31 of the pin members 30 each have an end 42 thereof adapted to extend beyond the internal surface 43 of the sleeve or closure member 22 and engage a shoulder 44 formed on the end 40 of the pump and motor unit D when the pin members 30 are in the position illustrated in FIGS. 1, 2, 3 and 4.

The external surface 45 of the pump and motor unit D is adapted to sealably engage the internal surface 43 of the sleeve 22 when received therein as the pump and motor unit D carries a plurality of O-ring seals 46 in the outer periphery 45 thereof.

The sleeve or closure member 22 is provided with a plurality of ports 47 which are adapted to cooperate with the inlet means 18 formed in the housing D when the sleeve 22 is in the position illustrated in FIG. 1. The ports 47 of the sleeve 22 permit fluid communication between the interior of the fuel tank T and the pump inlet means 12 of the pump and motor unit D when in the position illustrated in FIG. 1.

The operation of the pump and motor assembly will now be described. Assuming that the pump and motor unit D is completely disposed within the chamber G of the housing B, it can be seen that the outwardly projecting flanges 39 of the pump and motor unit D abut against the end 27 of the sleeve or closure member 22 and maintain the sleeve 22 in the position illustrated in FIG. 1 whereby the ports 47 formed therein permit fluid communication between the interior of the fuel tank T and the pump inlet means 12 through the passage means 18 formed in the housing B. The pump and motor unit D is suitably fastened to the housing B by bolts 41. The O-ring seals 25 and 46 carried respectively by sleeve 22 and the pump and motor unit D prevent fluid leakage between the housing B and the aperture H of the fuel tank T when the pump and motor unit D is fully disposed in the chamber G.

When the pump and motor unit D is fully inserted within the housing B, as illustrated in FIGS. 1 and 2, the ends 42 of the plates 31 carried by the pin members 30 are in the position illustrated whereby the ends 42 thereof are in engagement with the shoulders 44 of the pump and motor unit D.

It is to be understood that when the pump and motor unit D is fully inserted within the chamber G, the motor E is adapted to be supplied electrical current through a plug-in connection K carried thereby and being received in an electrical coupling L carried by the housing B. The electrical coupling L is, in turn, interconnected with a source of electrical current (not shown) in a manner well known in the art.

When it is desired to remove the pump and motor unit D from the fuel tank T, the mechanic removes the bolts 41 and grasps the handle J pulling downwardly until the pins 36 of the pin members 30 abut against stop means 48, the stop means 48 being defined by the ends of the grooves 35. The pin members 30 are moved axially with the pump and motor unit D as the shoulders 44 of the pump and motor unit D abut against the abutment means or ends 42 of the plates 31. As shown in FIG. 4, the sleeve or closure member 22 moves downwardly with the pump and motor unit D as the washer-like means 32 of the pin members 30 carries the same to that position. As shown in FIG. 4, the sleeve 22 now completely closes off the inlet means 18 of the housing B from the chamber G, the ports 47 in the sleeve 22 being disposed remote from the inlet means 18. The pump inlet means 12 of the pump and motor unit D may now be drained of any excess fuel remaining therein by opening a stop cock 49 disposed in the end 40 of the unit D. After the fuel has been drained from the pump inlet means 12, the pin members 30 are rotated approximately 90 degrees (see FIG. 5) thereby removing the ends 42 of the plates 31 from engagement with the shoulders 44 of the pump and motor unit D. Rotation of the pin members 30 is permitted because the pins 36 carried thereby are now disposed adjacent the annular grooves 37. When the pin members 30 have been rotated, the pump and motor unit D may be completely withdrawn from the chamber G as illustrated in FIG. 5. When the pump and motor unit D has been completely withdrawn from the chamber G, the sleeve or closure means 22 prevents fluid communication from the interior of the fuel tank T to the exterior thereof through the aperture H. The sleeve 22 is maintained in this position by the pin members 30 as the pins 36 thereof are locked within the annular grooves 37.

When it is desired to insert a pump and motor unit D within the chamber G of the housing B, the pump and motor unit D is inserted within the sleeve 22 and the housing B until the flanges 39 thereof abut against the end or abutment means 27 of the sleeve 22. The pin members 30 must then be rotated back to the position illustrated in FIGS. 1 and 3 before further movement of the pump and motor unit D into the chamber G may be accomplished. When the pin members 30 have been rotated back to the position illustrated in FIG. 1, whereby the pins 36 are aligned in the grooves 35, the pump and motor unit D is then inserted further within the chamber G until in the position illustrated in FIG. 1. This further movement of the pump and motor unit D causes axial movement of the sleeve or closure member 22 upwardly as the flanges 39 of the pump and motor unit D are in engagement with the end 27 of the sleeve 22 and carry the same upwardly. The pump and motor unit D is then fastened to the housing B by the bolt 41.

As shown in FIG. 1, the ports 47 of the closure member 22 are now disposed adjacent the inlet means 18 of the housing B as well as adjacent the pump inlet means 12 whereby fluid communication is permitted between the interior of the fuel tank T and the pump inlet means 12 thereby permitting the impeller to deliver fuel to the discharge means 21 upon operation of the pump and motor unit D. The ends 42 of the plates 31 of the pin members 30 are locked in engagement with the shoulders 44 of the pump and motor unit D when the pump and motor unit D is fully inserted within the chamber G as the pins 36 thereof prevent rotation of the pin members 30.

It can be seen that there has been disclosed herein a pump and motor assembly wherein the pump and motor unit having a pump inlet means is adapted to be inserted within a housing mounted within a fuel storage tank, the housing having means permitting fluid communication between the interior of the fuel tank and the pump inlet means when the pump and motor unit is disposed within the housing and preventing fluid communication between the interior of the fuel tank and the exterior thereof when the pump and motor unit is removed therefrom.

While this invention has been disclosed in connection with a certain specific embodiment thereof, it is to be understood that this is by way of example rather than limitation and it is intended that the invention be defined by the appended claims.

What is claimed is:

1. A pump and motor unit support comprising: a housing having end means; means defining bore means interrupting said end means and defining a pump and motor unit receiving chamber within said housing; means defining passage means in said housing, said passage means being adapted to fluidly interconnect said chamber with the exterior of said support; movable closure means carried by said housing; means defining a pair of abutment means on said closure means, said closure means permitting fluid communication between said chamber and said exterior through said passage means when in a first position relative to said housing and preventing said fluid communication when in a second position relative to said housing, said closure means being moved to said first position upon the reception in said chamber of a pump and motor unit which engages one of said abutment means and moves said closure means to said first position and being moved from said first position to said second position upon the withdrawal of said unit from said chamber which engages the other of said abutment means and moves said closure means to said second position, and additional means interconnected with said closure means movable between an engaging position and a disengaging position whereby said closure means is secured to said unit when said additional means is in its engaging position and said pump is disengaged for complete removal from said closure means when said additional means is in its disengaging position.

2. A pump and motor assembly comprising: a pump and motor unit support including a housing having end means; means defining bore means interrupting said end means and defining a pump and motor unit receiving chamber in said housing; means defining passage means in said housing, said passage means being adapted to fluidly interconnect said chamber with the exterior of said support; movable closure means carried by said housing; means defining a pair of abutment means on said closure means, said closure means permitting fluid communication between said chamber and said exterior of said support through said passage means when said closure means is in a first position relative to said housing and preventing said fluid communication when in a second position relative to said housing; and a pump and motor unit having pump inlet means and received in said housing, said pump and motor unit engaging one of said abutment means for moving said closure means to said first position upon the reception of said pump and motor unit in said chamber whereby said pump inlet means is in fluid communication with said exterior of said support through said passage means and engaging the other of said abutment means for moving said closure means from said first position to said second position upon withdrawal of said pump and motor unit from said chamber whereby fluid communication is prevented between exterior of said support and said chamber through said passage means, and additional means interconnected with said closure means movable between an engaging position and a disengaging position whereby said closure means is secured to said unit when said additional means is in its engaging position and said pump is disengaged for complete removal from said closure means when said additional means is in its disengaging position.

3. A pump and motor assembly comprising: a pump and motor unit support including a housing having end means; means defining bore means interrupting said end means and defining a pump and motor unit receiving chamber in said housing; means defining passage means in said housing, said passage means being adapted to fluidly interconnect said chamber with the exterior of said support; movable closure means carried by said housing; means defining a pair of abutment means on said closure means, said closure means permitting fluid communication between said chamber and said exterior of said support through said passage means when said closure means is in a first position relative to said housing and preventing said fluid communication when in a second position relative to said housing; and a pump and motor unit having pump inlet means and received in said housing, said pump and motor unit engaging one of said abutment means for moving said closure means to said first position upon the reception of said pump and motor unit in said chamber whereby said pump inlet means is in fluid communication with said exterior of said support through said passage means and engaging the other of said abutment means for moving said closure means from said first position to said second position upon withdrawal of said pump and motor unit from said chamber whereby fluid communication is prevented between said exterior of said support and said chamber through said passage means, said other abutment means being carried by said housing and axially movable relative thereto, said other abutment means including means for disengaging said other abutment from said pump and motor unit only when said closure means is in said second position whereby said pump and motor unit may be completely removed from said chamber.

4. In a fuel tank having wall means defining the interior of said tank and having an aperture in said wall means, a pump and motor assembly comprising: a pump and motor unit support including a housing having end means, means defining bore means interrupting said end means, means securing said housing to said wall means whereby said bore means cooperates with said aperture to define a pump and motor receiving chamber, means defining passage means in said housing, said passage means being adapted to fluidly interconnect said chamber with said interior of said tank, movable closure means carried by said housing, said closure means permitting fluid communication between said chamber and said interior of said tank through said passage means when said closure means is in a first position relative to said housing and preventing said fluid communication when said closure means is in a second position relative to said housing, means defining a pair of abutment means on said closure means, and a pump and motor unit having pump inlet means and received in said chamber, said pump and motor unit engaging one of said abutment means for moving said closure means to said first position upon the reception of said pump and motor unit in said chamber whereby said pump inlet means is in fluid communication with said interior of said tank through said passage means and engaging the other of said abutment means for moving said closure means from said first position to said second position upon the withdrawal of said pump and motor unit from said chamber whereby fluid communication is prevented between said interior of said support and said chamber through said passage means, and additional means interconnected with said closure means movable between an engaging position and a disengaging position whereby said closure means is secured to said unit when said additional means is in its engaging position and said pump is disengaged for complete removal from said closure means when said additional means is in its disengaging position.

5. In a fuel tank having wall means defining the interior of said tank and having an aperture in said wall means, a pump and motor assembly comprising: a pump and motor unit support including a housing having end means, means defining bore means interrupting said end means, means securing said housing to said wall means whereby said bore means cooperates with said aperture to define a pump and motor receiving chamber, means defining passage means in said housing, said passage means being adapted to fluidly interconnect said chamber with said interior of said tank, movable closure means carried by said housing, said closure means permitting fluid communication between said chamber and said interior of said tank through said passage means when said closure means is in a first position relative to said housing and preventing said fluid communication when said closure means is in a second position relative to said housing, means defining a pair of abutment means on said closure means, and a pump and motor unit having pump inlet means and received in said chamber, said pump and motor unit engaging one of said abutment means for moving said closure means to said first position upon the reception of said pump and motor unit in said chamber whereby said pump inlet means is in fluid communication with said interior of said tank through said passage means and engaging the other of said abutment means for moving said closure means from said first position to said second position upon the withdrawal of said pump and motor unit from said chamber whereby fluid communication is prevented between said interior of said support and said chamber through said passage means, said other abutment means being carried by said housing and axially movable relative thereto, said other abutment means including means for disengaging said other abutment from said pump and motor unit only when said closure means is in said second position whereby said pump and motor unit may be completely removed from said chamber.

References Cited in the file of this patent

UNITED STATES PATENTS

| | | |
|---|---|---|
| 2,384,254 | Meredew | Sept. 4, 1945 |
| 2,420,315 | Holt et al. | May 13, 1947 |

FOREIGN PATENTS

| | | |
|---|---|---|
| 557,523 | Great Britain | Nov. 24, 1943 |